Patented Nov. 25, 1930

1,783,083

UNITED STATES PATENT OFFICE

HANS GUBLER AND GUILLAUME DE MONTMOLLIN, OF BASEL, AND JOSEPH SPIELER, OF LAUFEN, SWITZERLAND, ASSIGNORS TO THE FIRM SOCIETY OF CHEMICAL INDUSTRY IN BASLE, OF BASEL, SWITZERLAND

DYESTUFFS CONTAINING METALS AND PROCESS OF MAKING SAME

No Drawing. Application filed July 9, 1929, Serial No. 377,068, and in Switzerland July 14, 1928.

The present invention relates to new dyestuffs containing metals. It comprises the new products, the method of producing same in substance, in the dye-bath, or on the fiber, the application thereof and the material which has been dyed with the new products.

It has been found that the new dyestuffs containing complex bound metals which correspond to azo-dyestuffs of the general formula

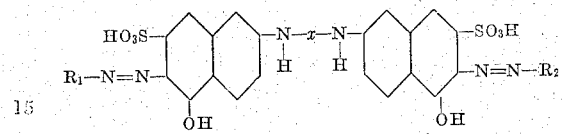

wherein $x$ stands for an organic residue containing at least one carbon atom, the

groups being linked to such carbon atoms of said residue which are united by a double bond with a nitrogen, oxygen or sulfur atom, and wherein $R_1$ means the residue of a benzene nucleus characterized by the presence of a COOR-group (R=H or alkyl) standing in ortho-position to the —N=N— group, and $R_2$ is the residue of a benzene nucleus characterized by the presence of a COOR- or OR-group (R=H or alkyl) standing in ortho-position to the —N=N— group, are very valuable cotton dyestuffs which yield on the vegetable fiber, as well as on artificial fibers of the group of the regenerated cellulose, such as viscose or cuprammonium silk tints, particularly orange, red, Bordeaux and brown, which may be distinguished by an excellent fastness to light. This is especially the case with regard to the dyestuffs in which $R_1$ means the residue of the anthranilic acid, or of the sulfoanthranilic acid, $R_2$ stands for the residue of the anthranilic acid or of an ortho-aminophenol, and $x$ for the residues

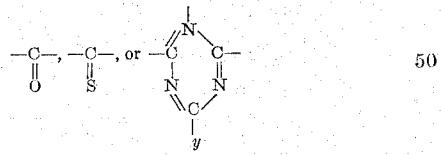

($y$ being any monovalent radical). The anthranilic acid can, however, be replaced by its esters, the ortho-aminophenols by their alkyl-ethers, and the phosgene or triazine residues by quinazolines and pyridazines halogenated in the heterocyclic nucleus, trichloropyrimidines, dichloromethylpyrimidines and the like.

As metals which are capable of forming complex compounds come first of all into question: chromium, manganese, iron, cobalt, nickel, copper, etc.

These dyestuffs are most conveniently obtained by combining intermediate products of the general formula

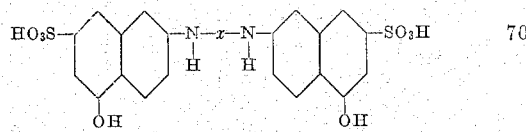

in which $x$ has the same meaning as above stated, with diazo-compounds corresponding to the residues $R_1$ and $R_2$. The products thus obtained are then treated with agents yielding copper, chromium, manganese, etc., which operation may be performed in substance, in the dye-bath or on the fiber.

Similar products are obtained by combining 2 molecular proportions of the azo-dyestuff of the general formula

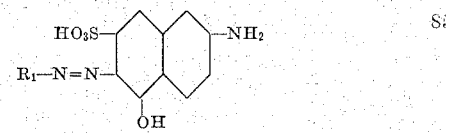

in which $R_1$ has the same meaning as above stated, or 1 molecular proportion of an azo-dyestuff of the general formula

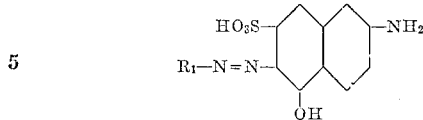

in which $R_1$ has the same meaning as above stated, and 1 molecular proportion of the azo-dyestuff of the general formula

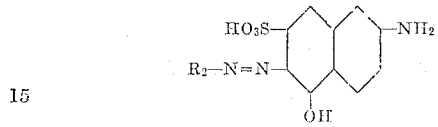

in which $R_2$ has the same meaning as above stated, with compounds which correspond to the residue $x$ already described hereinbefore, and then metallizing, or first metallizing separately the mono-azo-dyestuffs and condensing thereupon the products with phosgene or with its equivalents mentioned above.

The following examples illustrate the invention, the parts being by weight:—

*Example 1*

137 parts of 1-amino-2-benzenecarboxylic acid are dissolved in 1000 parts of water and 120 parts of hydrochloric acid of 30 per cent. strength, the solution is cooled with ice to 5° C. and then diazotized with 69 parts of sodium nitrite. The diazo-solution is run into a solution of 252 parts of the urea of 2-amino-5-hydroxynaphthalene-7-sulfonic acid in 2500 parts of water and 250 parts of calcined sodium carbonate. The coupling is finished in a short time. The dyestuff is isolated in the usual manner. When dry it is a brown powder which dissolves in water to an orange solution. It dyes cotton brown-orange tints, which by after-treatment with copper salts, change towards yellow-Bordeaux, with chromium or manganese salts slightly towards red and with iron, nickel or cobalt salts towards brown.

If it is desired to convert the dyestuff in substance into a metal compound, it is advantageous not to isolate the dyestuff but after the coupling operation to heat to 70° C., acidify with dilute sulfuric acid and add 300 parts of crystallized copper sulfate dissolved in 5 times its weight of water; the whole is then stirred for 2–3 hours at 80–90° C. The separated dyestuff acid of the copper compound is treated with dilute ammonia at 60° C., and the product salted out and isolated.

The new dyestuff dyes cotton red-brown tints of remarkable fastness to light.

The corresponding dyestuffs from thio-urea of the 2-aminohydroxynaphthalene-7-sulfonic acid have similar properties.

*Example 2*

53 parts of the urea of 2-amino-5-hydroxynaphthalene-7-sulfonic acid are coupled in the presence of sodium carbonate with 30.2 parts of 1-aminobenzene-2-carboxylic acid-methyl-ester, which has been diazotized in the usual manner. The azo-dyestuff thus formed precipitates and is filtered. It is stirred in water at 70° C. and there is added an ammoniacal solution of copper sulfate. After stirring for a short time at 70° C., the copper compound of the azo-dyestuff is formed. It is filtered and dried.

The new dyestuff dyes cotton fast red-brown tints of remarkable fastness to light.

A similar product is obtained when one molecular proportion of the diazo-compound of 1-aminobenzene-2-carboxylic acid methyl-ester is coupled with 2-amino-5-hydroxynaphthalene-7-sulfonic acid and the dyestuff is treated with phosgene and then with a copper salt, or first with a copper salt and then with phosgene.

*Example 3*

69 parts of 1-amino-2-benzenecarboxylic acid are dissolved in 500 parts of water and 60 parts of hydrochloric acid of 30 per cent. strength. The solution is cooled to 5° C. by means of ice and diazotized by means of 34.5 parts of sodium nitrite. The clear diazo-solution is allowed to run into a solution of 252 parts of the urea of 2-amino-5-hydroxynaphthalene-7-sulfonic acid in 2500 parts of water. There are then added 110 parts of crystallized sodium acetate. After stirring for about 2 hours there is added, by degrees, a sodium carbonate solution of 10 per cent. strength until the reaction is alkaline; there are then stirred in 120 parts of calcined sodium carbonate and there is added a diazo-solution made from 94.5 parts of 1-hydroxy-2-aminobenzene-4-sulfonic acid. When coupling is complete the whole is heated to 80° C., dilute sulfuric acid is added until the reaction to congo is feebly acid and 300 parts of crystallized copper sulfate are introduced in the form of a solution of 20 per cent. strength, the whole being stirred for 2 hours at 80–85° C. The separated dyestuff acid of the copper compound is filtered, stirred with dilute ammonia at 60° C., the ammonium salt is salted out with common salt and filtered. The dyestuff dyes cotton Bordeaux red tints of most excellent fastness to light.

*Example 4*

64.8 parts of the tertiary condensation product from 2 molecular proportions of 2-amino-5-hydroxynaphthalene-7-sulfonic acid, 1 molecular proportion of aniline and 1 molecular proportion of cyanuric chloride are dissolved in 900 parts of water with addition of 50 parts of calcined sodium carbonate, and there is added at 0–5° C. the diazo-solution from 27.4 parts of 1-amino-2-benzenecarboxylic acid. When coupling is complete, the dyestuff is isolated in the usual manner, then stirred into 3000 parts of water at 40° C. and the whole is mixed with an ammoniacal solution of 60 parts of crystallized copper sulfate in 200 parts of water. The whole is stirred for 2–3 hours and the ammonium salt of the copper compound of the dyestuff is separated in the usual manner. The dyestuff dyes cotton directly red-brown tints of pronounced fastness to light.

The following table gives color tints on cotton, which are obtainable by means of a small number of metalliferous dyestuffs which can be made in accordance with this invention:

zene nucleus characterized by the presence of a COOR-group (R=H or alkyl) standing in ortho-position to the —N=N— group, and $R_2$ is the residue of a benzene nucleus characterized by the presence of a COOR- or OR-group (R=H or alkyl) standing in ortho-position to the —N=N— group, and, on the other hand, contain complex bound metals of the atomic weight ranging between 52.1 and 63.6, which products are dark powders which dye vegetable fibers and artificial fibers of the regenerated cellulose orange, red, Bordeaux and brown tints of excellent fastness to light.

2. As new articles of manufacture the azo-dyestuffs containing complex bound metals, which, on the one hand, correspond to azo-

| 1st component: corresponding with $R_1$—N=N—OH | 2nd component: (diazotizing component of the residue $R_2$) | Coupling component | Dyestuff containing copper dyes cotton direct |
|---|---|---|---|
| 1-aminobenzene-5-chloro-2-carboxylic acid. | 1-aminobenzene-5-chloro-2-carboxylic acid | Urea of 2-amino-5-hydroxynaphthalene-7-sulfonic acid | Red brown |
| 1-aminobenzene-5-nitro-2-carboxylic acid | 1-aminobenzene-5-nitro-2-carboxylic acid | Do. | Brown |
| 1-aminobenzene-5-methoxy-2-carboxylic acid | 1-aminobenzene-5-methoxy-2-carboxylic acid | Do. | Red brown |
| 1-aminobenzene-2-carboxylic acid | 1-aminobenzene-5-chloro-2-carboxylic acid | Do. | Red brown |
| Do. | 1-hydroxy-2-aminobenzene-4-sulfonic acid | Do. | Bordeaux |
| Do. | 1-hydroxy-2-aminobenzene-4-sulfamide | Do. | Bordeaux |
| Do. | 1-hydroxy-2-amino-4-nitrobenzene | Do. | Bordeaux |
| Do. | 1-hydroxy-2-amino-4:6-dinitrobenzene | Do. | Bordeaux |
| Do. | 1-hydroxy-2-amino-4-methyl-6-nitrobenzene | Do. | Yellow-brown |
| Do. | 1-hydroxy-2-aminobenzene-4-sulfo-6-carboxylic acid | Do. | Red |
| Do. | 1-amino-2-hydroxy-naphthalene-4-sulfonic acid | Do. | Brown red |
| Do. | Nitrated diazo-compound of 1-amino-2-hydroxynaphthalene-4-sulfonic acid | Do. | Brown red |
| Do. | 1-hydroxy-2-amino-4-chlorobenzene | Do. | Bordeaux |
| 1-aminobenzene-4-sulfo-2-carboxylic acid | 1-aminobenzene-4-sulfo-2-carboxylic acid | Do. | Brown |
| 1-amino-2-benzene-carboxylic acid | 1-aminobenzene-2-sulfonic acid | Do. | Brown |
| Do. | 1-amino-2-methoxy-benzene-5-sulfonic acid | Do. | Brown red |
| 1-aminobenzene-2-carboxylic acid | 1-aminobenzene-2-carboxylic acid | Tertiary condensation product of 2 molecular proportions of 2-amino-5-hydroxy-naphthalene-7-sulfonic acid, 1 molecular proportion of aniline and 1 molecular proportion of cyanuric-chloride | Red brown |

What we claim is—

1. As new articles of manufacture the azo-dyestuffs containing complex bound metals, which, on the one hand correspond to azo-dyestuffs of the general formula

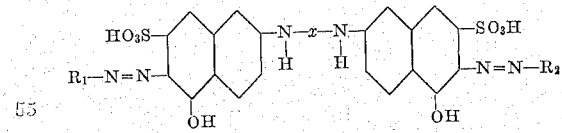

wherein $x$ stands for an organic residue containing at least one carbon atom, the

groups being linked to such carbon atoms of said residue which are united by a double bond with a nitrogen, oxygen or sulfur atom, and wherein $R_1$ means the residue of a bendyestuffs of the general formula

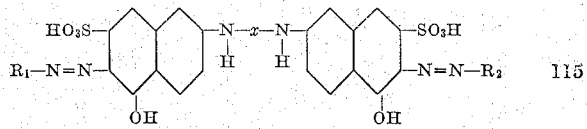

wherein $x$ stands for an organic residue containing at least one carbon atom, the

groups being linked to such carbon atoms of said residue which are united by a double bond with a nitrogen, oxygen or sulfur atom, and wherein $R_1$ means the residue of a benzene nucleus characterized by the presence of a COOR-group (R=H or alkyl) standing in ortho-position to the —N=N— group, and $R_2$ is the residue of a benzene nucleus characterized by the presence of a COOR- or OR-group (R=H or alkyl) standing in ortho-position to the —N=N— group, and, on the other hand, contain complex bound metals of the atomic weight ranging between 56 and 63.6, which products are dark powders which dye vegetable fibers and artificial fibers of the regenerated cellulose orange, red, Bordeaux, and brown tints of excellent fastness to light.

3. As new articles of manufacture the azo-dyestuffs containing complex bound copper, which correspond to the azo-dyestuffs of the general formula

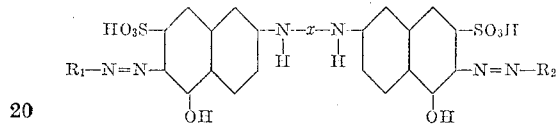

wherein $x$ stands for an organic residue containing at least one carbon atom, the

groups being linked to such carbon atoms of said residue which are united by a double bond with a nitrogen, oxygen or sulfur atom, and wherein $R_1$ means the residue of a benzene nucleus characterized by the presence of a COOR-group (R=H or alkyl) standing in ortho-position to the —N=N— group, and $R_2$ is the residue of a benzene nucleus characterized by the presence of a COOR- or OR-group (R=H or alkyl) standing in ortho-position to the —N=N— group, which products are dark powders which dye vegetable fibers and artificial fibers of the regenerated cellulose orange, red, Bordeaux, and brown tints of excellent fastness to light.

4. As new articles of manufacture the azo-dyestuffs containing complex bound copper, which correspond to the azo-dyestuffs of the general formula

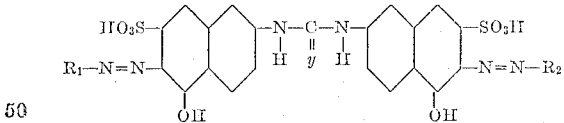

wherein $y$ means O or S, $R_1$ the residue of a benzene nucleus characterized by the presence of a carboxyl group standing in ortho-position to the —N=N— group, and $R_2$ the residue of a benzene nucleus characterized by the presence of a carboxyl or hydroxyl group standing in ortho-position to the azo-groups, which products are dark powders which dye vegetable fibers and artificial fibers of the regenerated cellulose orange red, Bordeaux and brown tints of excellent fastness to light.

5. As new articles of manufacture the azo-dyestuffs containing complex bound copper, which correspond to the azo-dyestuffs of the general formula

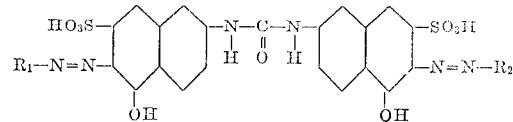

wherein $R_1$ means the residue of a benzene nucleus characterized by the presence of a carboxyl group standing in ortho-position to the —N=N— group, and $R_2$ the residue of a benzene nucleus characterized by the presence of a carboxyl or hydroxyl group standing in ortho-position to the azo-groups, which products are dark powders which dye vegetable fibers and artificial fibers of the regenerated cellulose orange, red, Bordeaux and brown tints of excellent fastness to light.

6. The material dyed with the products of claim 1.

7. The material dyed with the products of claim 2.

8. The material dyed with the products of claim 3.

9. The material dyed with the products of claim 4.

10. The material dyed with the products of claim 5.

In witness whereof we have hereunto signed our names this 28th day of June, 1929.

HANS GUBLER.
GUILLAUME DE MONTMOLLIN.
JOSEPH SPIELER.